United States Patent [19]
Ray

[11] Patent Number: 5,396,683
[45] Date of Patent: Mar. 14, 1995

[54] CHILD RESTRAINT

[76] Inventor: Reji M. Ray, 1383 Middle Brook Way, Rohnert Park, Calif. 94928

[21] Appl. No.: 121,721

[22] Filed: Sep. 15, 1993

[51] Int. Cl.$^6$ .......................... A44B 21/00; A45F 5/00
[52] U.S. Cl. ...................................... 24/3 M; 24/3 R; 224/253; 128/875
[58] Field of Search ......................... 24/3 M, 3 R, 3 B; 128/875, 876, 846, 869; 224/253, 267

[56] References Cited

U.S. PATENT DOCUMENTS

| | | | |
|---|---|---|---|
| 1,477,680 | 12/1923 | Betlin | 24/3 M |
| 2,661,888 | 12/1953 | Sidlinger | 128/876 |
| 3,458,188 | 7/1969 | Infante | 224/254 |
| 4,172,453 | 10/1979 | Lackie | 128/876 |
| 4,788,941 | 12/1988 | Villeneuve | 128/876 |
| 4,972,980 | 11/1990 | Parsons | 24/3 M |
| 4,998,653 | 3/1991 | Labelle | 224/253 |
| 5,201,448 | 4/1993 | Schue | 224/253 |
| 5,205,448 | 4/1993 | Kester et al. | 224/253 |
| 5,275,178 | 1/1994 | Roberson et al. | 128/869 |

FOREIGN PATENT DOCUMENTS

| 0148283 | 7/1951 | Australia | 224/267 |
|---|---|---|---|

*Primary Examiner*—Victor N. Sakran
*Attorney, Agent, or Firm*—Harold D. Messner

[57] ABSTRACT

A child restraint device includes a tethering line releasably attached to an integrally formed belt-pack having an adjustable belt of width W1 attached to a pack by flaps extending from opposed vertical intersections of an arcuate front wall with a back wall, such back defining an exterior surface that can be placed in friction contact with the child. The shape of such exterior surface varies but in each embodiment is constructed to have a contact height H1 relative to a portion of the child's body that is greater than width W1 of the belt to assure adequate friction-generating area with the child's waist to secure the belt-pack to the child without shoulder straps, i.e., H1 > W1. In one embodiment, the pack resembles a pill box in which a transversely directed zipper on a side opposite the belt, that permits easy entry into the interior cavity of the box. In another embodiment, the pack resembles a duck facing toward the child's waist having a poach-cavity formed in a direction away from the child wherein entry is facilitated using a vertically directed zipper. In yet another embodiment, the pack resembles a bear also facing toward the child's waist and having a similarly formed poach-cavity. In accordance with the invention, the tethering line can be formed of cloth, plastic, lather or a combination of the above. In a preferred form, the line comprises a first loop of cloth attached to an end link of a chain formed of plastic, and a second loop of clothe attached to the opposite end of the chain. The second loop is then attached to a clasp to permit attachment to the pack.

18 Claims, 2 Drawing Sheets

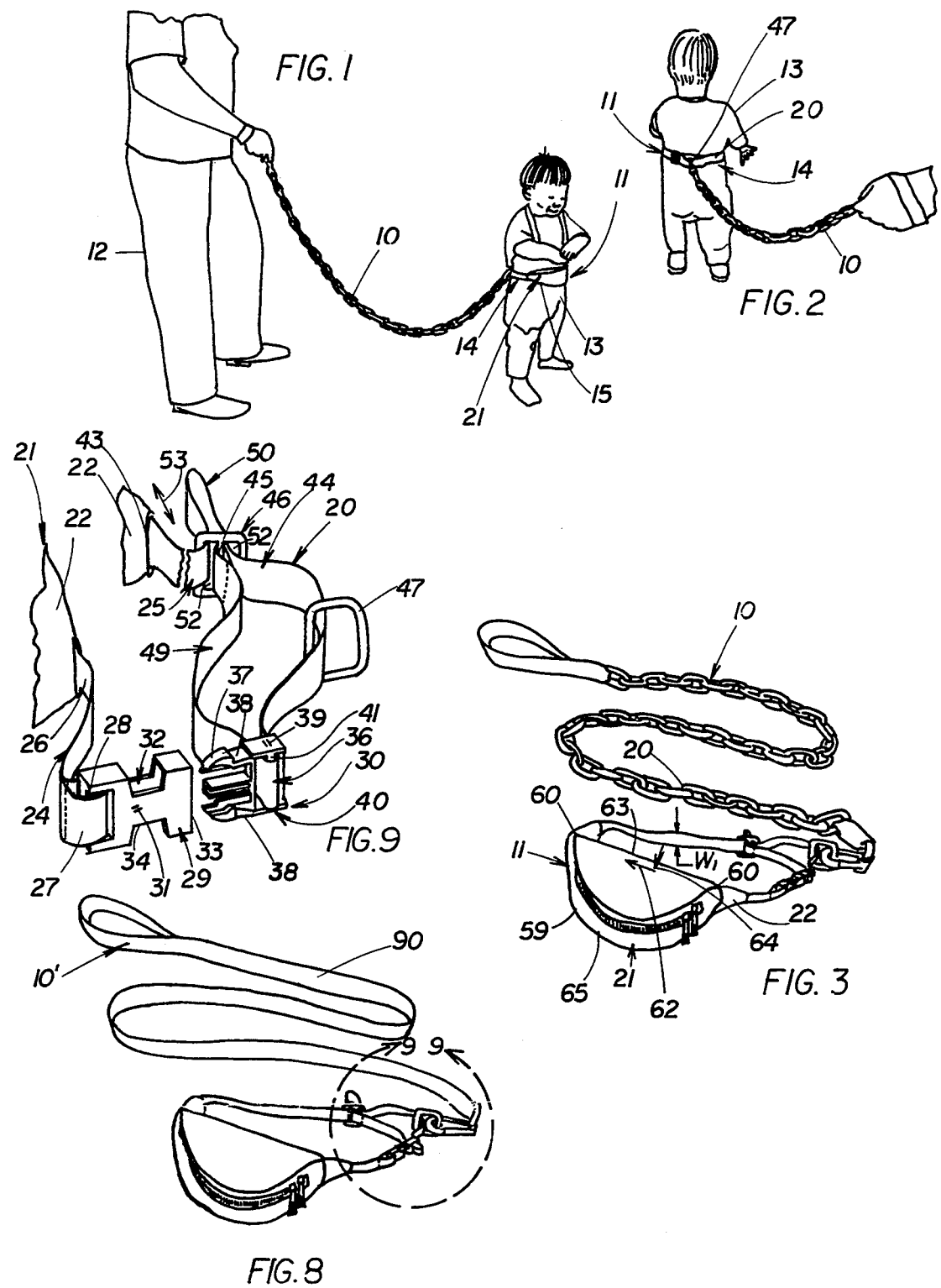

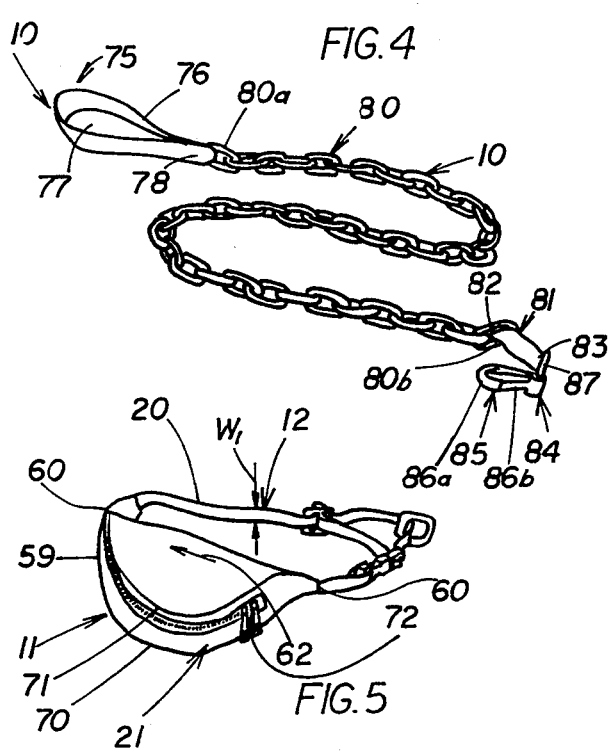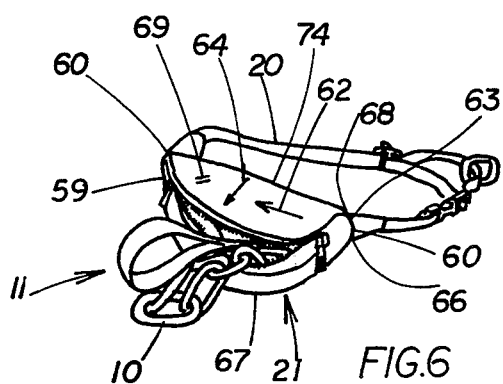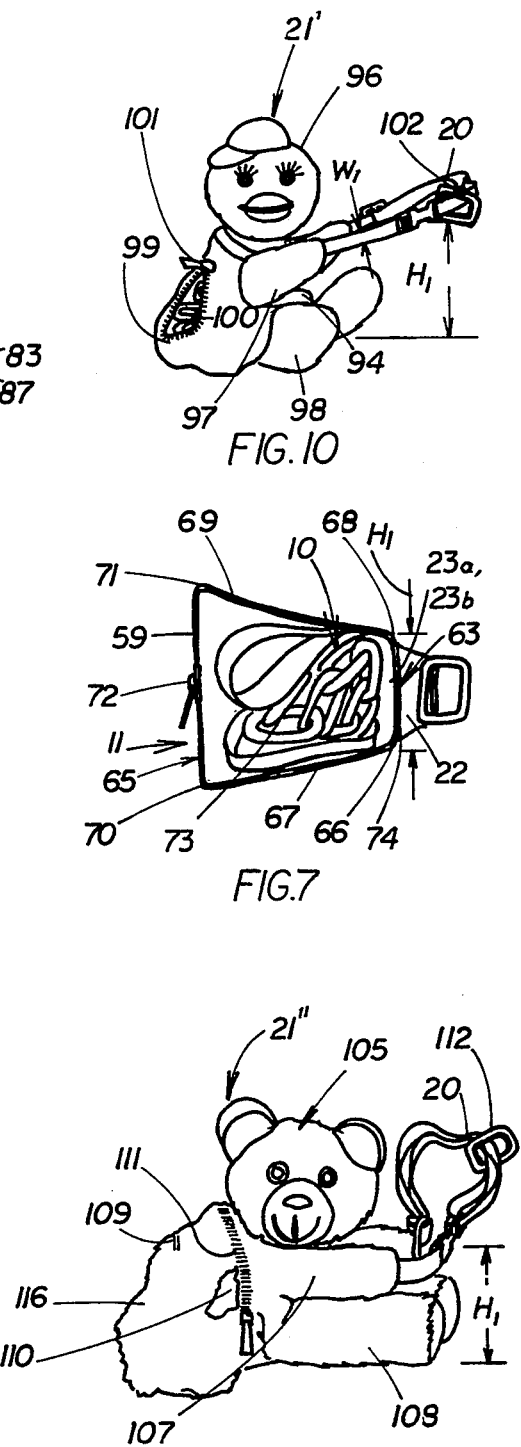

CHILD RESTRAINT

SCOPE OF THE INVENTION

This invention relates to a child restraint that includes a tethering line releasably attached to a waist-hugging belt-pack that circumscribes a child wherein the line constrains the child attached by line to an attending adult within a selected diameter of safety.

BACKGROUND OF THE INVENTION

Various harness-type child restraints have been proposed. These include shoulder straps that attach via a clasp to a tethering line. However, attachment of such restraints has been found to be time-consuming since each vertical strap as well as a horizontal strap has to be adjusted. Also when not in use, stowage of such restraints can be a problem especially for travelers.

SUMMARY OF THE INVENTION

The present invention includes a tethering line releasably attached to an integrally formed belt-pack having an adjustable belt of width W1 attached to a pack by flaps extending from opposed vertical intersections of an arcuate front wall with a back wall, such back defining an exterior surface that can be placed in friction contact with the child say adjacent to the abdomen. The shape of such exterior surface varies but in each embodiment is constructed to have a contact height H1 relative to a portion of the child's body that is greater than width W1 of the belt to assure adequate friction-generating area with the child's waist to secure the belt-pack to the child without shoulder straps, i.e., H1>W1. In one embodiment, the pack resembles a pill box in which a transversely directed zipper on a side opposite the belt, that permits easy entry into the interior cavity of the box. In another embodiment, the pack resembles a duck facing toward the child's waist having a poach-cavity formed in a direction away rom the child wherein entry is facilitated using a vertically directed zipper. In yet another embodiment, the pack resembles a bear also facing toward the child's waist and having a similarly formed poach-cavity. In accordance with the invention, the belt is segmented having first and second sections. The first section is attached to one of the flaps of the pack and has an opposite end permanently attached to a post of a female element of a bayonet coupler. The second section is attached to the other of the flaps of the pack, and has an intermediate segment that loops about a central post of a rectangularly shaped buckle, thence through a D-ring and then loops about a central post of a male element of the bayonet coupler and finally loops back toward and permanently attaches to the central post of the buckle. A looped portion of the intermediate segment can be elongated relative to the central post to adjust the total length of the belt. The central openings of the buckle defined by the cental post are constructed to cause friction wedging of the intermediate segment relative to the buckle to keep the defined length after adjustment has occurred.

The tethering line can be formed of cloth, plastic, lather or a combination of the above. In a preferred form, the line comprises a first loop of cloth attached to an end link of a chain formed of plastic, a second loop attached to a clasp having a side wall pivotal to permit a clip of the clasp to attach about the D-ring of the pack. In a second embodiment, the line comprises a clothe line and end loops in similar form as in the preferred embodiment. Other materials could also be used, but should be light weight and of a length L such that the line can be stowed within the cavity of the pack and carriable by the child when not in use.

BRIEF DESCRIPTION OF THE DRAWINGS

FIG. 1 is a perspective view of an adult-attendant and child illustrating the use of the invention in confining the child by means of a tethering line attached to a waist-circumscribing belt-pack comprising a pill box and segmented belt;

FIG. 2 is a detail of FIG. 1 illustrating how the tethering line is attached to the belt-pack of FIG. 1;

FIG. 3 is a perspective view of the tethering line and belt-pack of FIGS. 1 and 2 with the latter being removed from actual contact with the adult and child;

FIG. 4 is a perspective view of the tethering line of FIGS. 1-3;

FIGS. 5 and 6 are perspective views of the belt-pack of FIGS. 1-3 showing the latter in an closed and open condition wherein the tethering line can be stowed within the cavity of the pack;

FIG. 7 is a detail side view of the pack of FIG. 6 partially cut-away to illustrate stowage of the tethering line within the pack;

FIG. 8 is a perspective view of second embodiment of the tethering line of FIG. 4 formed of clothe in attached to the belt-pack of FIGS. 1 and 2 with the latter being removed from actual contact with the adult and child shown in FIGS. 1 and 2;

FIG. 9 is enlarged detail of the belt of the invention taken along line 9—9 of FIG. 8;

FIG. 10 is a side view of second embodiment of the pack of the invention in the form of a duck;

FIG. 11 is a side view of third embodiment of the pack of the invention in the form of a bear.

DESCRIPTIONS OF EMBODIMENTS OF THE INVENTION

As shown in FIG. 1, the present invention includes a tethering line 10 releasably attached to an integrally formed belt-pack 11 so as permit an adult 12 to safely constrain a child 13 attached by tethering line 10 to the attending adult 12 within a selected diameter of safety.

As shown in FIGS. 3, 5-7, the belt-pack 11 includes an adjustable belt 20 of width W1 attached to a conventional waist pack 21 by flaps 22 extending from opposed intersections 23a, 23b, see FIG. 7. The belt 20 and waist pack 21 will now be described.

As shown in FIG. 9, belt 20 is segmented and includes a first section 24 and a second section 25. The first section 24 has an end region 26 attached to one of the flaps 22 of the pack 21 and an opposite end region 27 sttached to a post 28 of a female element 29 of a bayonet coupler 30. The female element 29 includes I-shaped housing 31 hollow over its major length and is seen to be open relative to its interior cavity 32 at two locations: at end 33 opposite to post 28 and over a mid-region 34. In that way, a male element 36 can be slide into the interior cavity 32 of the housing 31 of the female element 29 and be releasably coupled thereto via enlarged ends 37 of a pair of parallel tines or fingers 38 extending from a housing 39. Opposite to the parallel tines 38 the housing 39 is open over region 40 to define a post 41.

The second section 25 of the belt 20 includes a first end 43 attached to the other of the flaps 22 of the pack 21, and an intermediate segment 44. The intermediate segment 44 extends from the first end 43 of the belt 20 and is seen to loop about a central post 45 of a rectangularly shaped buckle 46, thence through a D-ring 47 and then loops about the post 41 of the male element 36 of the bayonet coupler 30 and finally loops back toward and permanently attaches via a terminating segment 49 to the central post 45 of the buckle 46. Note in the region of the central post 45 of the buckle 46 that the intermediate segment 44 of the belt 20 includes a loopable, adjusting portion 50. In operations, the loopable portion 50 can be pushed into and through a pair of openings 52 at the sides of the post 45 of the buckle 46 in the directions of arrow 53 to adjust the total length of the belt 20. Note that such adjustments are finalized because of dimensions of the pair of openings 52 are constructed with respective to the thickness of the intermediate segment 44 so that friction wedging occurs. That is, wedging between the intermediate segment 44 and the sides of the openings 52 prevents relative movement between the intermediate segment 44 and the buckle 46 and retains a defined length for the belt 20 after adjustment via the loopable portion 50 has occurred.

As previously mentioned, the waist pack 21 includes a pair of flaps 22 that are affixed to the belt 20 in the manner previously described. As shown in FIGS. 3, 5-7, waist pack 21 is constructe in the form of an arcuately shaped truncated box 59. Box 59 has a pair of corners 60, such corners 60 defining the intersections 23a, 23b previously mentioned (FIG. 7). Between the corners 60 in the transverse direction of arrow 62 is a back wall 63 and in the longitudinal direction of arrow 64 is curved front wall 65. As shown in FIG. 7, the back and front walls 63, 65 meet at intersections 23a, 23b. The back wall 63 also includes a first lower edge 66 attaching to bottom wall 67, and additionally, includes a second upper edge 68 that attaches to a top wall 69. Note that the bottom and top walls 67, 69 are similar shaped extending outward from edges 66, 68 to curved arcuate terminating edges 70, 71 and define parallel planes spaced one above the other. Closure along edge 70 (between the front wall 65 and the bottom wall 67) is permanent, while closure adjacent edge 71 (between the front wall 65 and the top wall 69) is assisted by a zipper 72 to permit easy entry into interior cavity 73 for stowage of teethering line 10 therein.

Tethering line 10 of FIGS. 3, 4, 6 and 7 can be of clothe, plastic, leather or a combination of the above. In a preferred form in FIG. 4, the line 10 includes a first segment 75 made of clothe having a first end region 76 that is curved back on itself (and attached) to form a loop 77. At a second end region 78, the first segment 75 attaches to end link 80a of chain 80 formed of plastic. At the far end of the line 10 is a second segment 81 made of clothe having a first end 82 attached to terminating end link 80b of the chain 80d and a second end 83. The end 83 in turn is attached to a clasp 84. The clasp 84 includes a tear-dropped shaped clip 85 having a segmented side wall 86a, 86b in which side wall 86b can be pivoted inwardly the D-ring 47 of the belt 20, see FIG. 2. Opposite to the clip 85 is a ring 87 the latter being attached to the end 83 of the second segment 81.

In operations, the adult 12 of FIGS. 1 and 2 first attaches the waist pack 21 to the abdomen 15 of the child 13 by inserting the male element 36 of the bayonet coupler 30 into the female element 29, see FIG. Next, the length of the belt 20 is adjusted by relative movement of the loopable portion 50 relative to the openings 52 of the buckle 46. Initially it is contemplated that the tethering line 10 will be stowed within the interior cavity 73 of the waist pack 21 as shown in FIGS. 6 and 7. However because tethering line 10 is light weight, such attachment of the waist pack 21 results in the formation of a relatively large non-movable contact zone between exterior surface 74 of the back wall 63 and the abdomen 15 of the child 13, see FIG. 1. That is, returning to FIG. 7. the back wall 63 can be placed in friction contact with the child even though the tethering line 10 is stowed interior of the waist pack 21 without the waist pack 21 falling to the ground because of weight. When the adult 12 wants to use the tethering line 10, the latter is removed from the waist pack 21 and the clip 85 of the clasp 84 of FIG. 4 is attached the D-ring 47 of the belt 20 as shown in FIG. 2. In that way, the adult 12 can supervise the movements of the child 13 in the manner of FIGS. 1 and 2. Thereafter, the tethering line 10 can be disconnected from the belt 20 and stowed within the pack 21. At a later time, the belt-pack 11 can be removed from the child 13.

MODIFICATIONS

There are various modifications, changes and additions that can be made to the tethering line 10 and belt-pack 11 of the invention. For example, as shown in FIG. 8 the plastic chain 80 of FIG. 4 can be replaced by a clothe section 90. That is, in the modified tethering line 10' of FIG. 8, the line 10' is composed entirely of cloth shaped and constructed as previously described. Other materials could also be used, but should be a length such that the resulting teethering line 10 or 10' can be stowed within the pack 21 in the manner of FIGS. 6 and 7 when not in use.

In regard to the belt-pack 11, the pack 21 can be provided with various shapes and construction materials. Selected variations are shown in FIGS. 10 and 11. Note in this regard that in each such embodiment, there is defined a contact height H1 between exterior surfaces 94 of each modified pack 21' and 21''. Note that such height H1 is at least greater than the width W1 of the belt 20. That is, H1>W1. In that way, there is adequate contact area when the pack 21, 21' or 21'' is attached to a child in the manner previously described without a need for shoulder straps.

In more detail, as shown in FIG. 10, the pack 21' is seen to resemble a duck 96, such duck 96 facing toward the belt 20. The duck 96 includes upper and lower appendages 97, 98 to form contact height H1. The upper appendages 97 are seen to attach to the ends of the belt 20 that includes a D-ring 102. Opposite to appendages 97, 98 there is formed a front wall 99 and a poach-cavity 100. The poach-cavity 100 is provided with a vertically directed zipper 101 and provides the same function for stowage of a tethering line (not shown) as previously mentioned. In still more detail as shown in FIG. 11, the pack 21'' resembles a bear 105. The bear 105 faces toward belt 20 that includes D-ring 112. The bear 105 has upper and lower appendages 107, 108 to form contact height H1. The upper appendages 107 are seen to attach to the ends of the belt 20. Opposite to appendages 107, 108 there is formed a front wall 109 and a poach-cavity 110, the latter being provided with a zipper 111 having a stowage function for a tethering line as before.

What is claimed is:

1. A child restraint device comprising a tethering line for supervising movement of a child, and a belt-pack, said tethering line being releasably attached to said belt-pack including a pack and a belt of width W1 attached to said pack by appendage means, said pack defining an exterior surface facing toward said belt that can be placed in friction contact with a child to be supervised wherein a contact height H1 relative to a portion of the child's body is defined that is sufficient to assure adequate friction-generating area with the child to secure said belt-pack to the child without shoulder straps, said pack including a cavity having an opening facing away from said belt, said cavity being of sufficient volume to stow said tethering line therein.

2. The restraint device of claim 1 in which said contact height H1 is related to width W1 of said belt wherein H1>W1.

3. The restraint device of claim 1 in which said pack resembles a pill box.

4. The restraint device of claim 1 in which said pack resembles a duck.

5. The restraint device of claim 1 in which said pack resembles a bear.

6. The restraint device of claim 1 in which said tethering line comprises a chain formed of light-weight plastic and a clasp attached relative to said chain, said clasp including a clip having a movable side wall to permit releasable attachment of said tethering line relative to said belt-pack.

7. The restraint device of claim 6 in which tethering line includes a first loop of cloth attached to one end of said plastic chain and a second loop of cloth attached to said clasp.

8. The restraint device of claim 1 in which said tethering line is formed entirely of cloth, and includes a clasp attached at a remote end of said line, said clasp including a clip having a movable side wall to permit releasable attachment of said tethering line relative to said belt-pack.

9. The restraint device of claim 1 in which said belt includes segmented first and second strap sections, a bayonet coupler and a ring means carried on one of said first and second strap sections for releasable engagement with said tethering line.

10. In a child restraint device, the combination comprising a child for which constraint of movement is desired, said child having a waist, a belt-pack attached to said waist of said child, said belt-pack including a pack and a belt of width W1 attached to said pack by appendage means, said pack defining an exterior surface facing toward said belt positionable in friction contact with said child wherein a contact height H1 relative to a portion of the child's body is defined that is sufficient to assure adequate friction-generating area to secure said belt-pack to the child without shoulder straps, and a tethering line releasably attachable to said belt-pack to limit movement of said child within a selected diameter, said pack also including a cavity having an opening facing away from said belt, said cavity being of sufficient volume to stow said tethering line therein.

11. The combination of claim 10 in which said contact height H1 is related to width W1 of said belt wherein H1>W1.

12. The combination of claim 11 in which said pack resembles a pill box.

13. The combination of claim 11 in which said pack resembles a duck.

14. The combination of claim 11 in which said pack resembles a bear.

15. The combination of claim 10 in which said tethering line comprises a chain formed of light-weight plastic and a clasp attached relative to said chain, said clasp including a clip having a movable side wall to permit releasable attachment of said tethering line relative to said belt-pack.

16. The combination of claim 15 in which tethering line includes a first loop of cloth attached to one end of said plastic chain and a second loop of cloth attached to said clasp.

17. The combination of claim 11 in which said tethering line is formed entirely of cloth, and includes a clasp attached at a remote end of said line, said clasp including a clip having a movable side wall to permit releasable attachment of said tethering line relative to said belt-pack.

18. The combination of claim 10 in which said belt includes segmented first and second strap sections, a bayonet coupler and a ring means carried on one of said first and second strap sections for releasable engagement with said tethering line.

* * * * *